(12) United States Patent
Aoki

(10) Patent No.: US 6,557,827 B1
(45) Date of Patent: May 6, 2003

(54) LEAF SPRING VALVE

(75) Inventor: Kazuhiro Aoki, Yamanashi (JP)

(73) Assignee: Kitz Corporation, Chiba (JP)

( * ) Notice: Subject to any disclaimer, the term of this patent is extended or adjusted under 35 U.S.C. 154(b) by 0 days.

(21) Appl. No.: 09/937,299

(22) PCT Filed: Mar. 30, 2000

(86) PCT No.: PCT/JP00/02008

§ 371 (c)(1),
(2), (4) Date: Sep. 25, 2001

(87) PCT Pub. No.: WO00/58649

PCT Pub. Date: Oct. 5, 2000

(30) Foreign Application Priority Data

Mar. 31, 1999 (JP) .............................. 11-090775
Dec. 22, 1999 (JP) .............................. 11-365387

(51) Int. Cl.$^7$ .............................................. F16K 51/00
(52) U.S. Cl. .......................... 251/313; 251/901; 251/902
(58) Field of Search ................................. 251/313, 901, 251/902

(56) References Cited

U.S. PATENT DOCUMENTS

| | | | |
|---|---|---|---|
| 2,784,740 A | | 3/1957 | Stageberg |
| 3,137,315 A | | 6/1964 | Simpson |
| 3,741,234 A | | 6/1973 | Siebold |
| 3,973,582 A | | 8/1976 | Siebold |
| 5,238,023 A | * | 8/1993 | Olofsson .................... 251/901 |
| 5,255,628 A | * | 10/1993 | Kristoffer .................. 251/901 |

FOREIGN PATENT DOCUMENTS

| | | |
|---|---|---|
| JP | 62-136680 | 8/1987 |
| JP | 2-116078 | 9/1990 |
| JP | 10-30420 | 2/1998 |

* cited by examiner

*Primary Examiner*—Ehud Gartenberg
*Assistant Examiner*—John Bastianelli
(74) *Attorney, Agent, or Firm*—Wenderoth, Lind & Ponack, L.L.P.

(57) ABSTRACT

The valve is enabled, by being endowed with the force of stored energy, to generate an opening/closing motion with a small operating torque infallibly and stably, permit a reduction in cost, allow a compact construction, excel in durability, and enjoy a highly satisfactory practical value. Further by endowing the valve body which has already acquired the function of water stop with the function of steady flow volume thereby diversifying functionality, the valve is enabled to acquire the function of varying steady flow volume by virtue of the rotational frequency of the spiral spring. In the type of spring for opening/closing and controlling the flow path for a fluid, a leaf spring valve is provided which has one end of a spiral spring 47 mounted in a valve chamber 42 of a valve box 41 and the other end thereof mounted on a valve shaft 52 in the valve chamber 42, and the lateral surface of the spiral spring 47 opposed in a pressed state to a valve seat 42a of the valve box 41, whereby the lateral surface of the spiral spring 47 is separated from the valve seat 42a till a flow path outlet 44 on the secondary side is opened by rotating the valve shaft 52 by means of an actuator 55 thereby displacing the spiral spring 47 centripetally toward the valve shaft 52.

16 Claims, 18 Drawing Sheets

LEAF SPRING VALVE

TECHNICAL FIELD

This invention relates to a leaf spring valve that opens/closes or adjusts the flow path thereof and fulfills the function of a flow regulating valve and utilizes a spring as its valve body. More specifically, this invention relates to a leaf spring valve having a built-in drive valve body that has the force of stored energy and fulfills the function of a flow regulating valve, and utilizing this force of stored energy for driving and controlling the valve body, and to an air conditioning device using the leaf spring valve.

BACKGROUND ART

As typical valves for opening/closing the flow path, generally, there have been known ball valves which open/close the flow path by rotating a ball valve body disposed inside the valve main body thereof and provided therein with a through-hole and gate valves which open/close the flow path by vertically reciprocating a wedge-shaped valve body inside the valve main body thereof.

There is an electric motor-operated valve as one example of the automatic valve. This electric motor-operated valve has a construction which opens/closes or adjusts the flow path of a rotary valve such as a ball valve with an electric motor. A spring return type of electric motor-operated valve which generates an opening motion by means of a motor and a closing motion by utilizing the rewinding force of a spiral spring which has been rolled up as synchronized with the opening motion of the motor has been already reduced to practice.

As another special type of valve construction, a relief valve having a construction such that the opening of a cylindrical valve is opened/closed by means of a helical valve body formed of a shape memory alloy has been proposed (as disclosed in JP-A-HEI 10-30,420).

The flow regulating valve is of a type that controls the flow volume at a fixed level. Generally, it has mounted in the valve main body thereof a steady flow cartridge so selected as to conform to the set flow volume.

The various types of valve construction heretofore proposed and reduced to practice, however, entail the following problems.

For a start, the ball valve, i.e. a general type of valve, has such a construction that the ball valve body is rotated as pressed with a suitable compressible force against an annular ball seat and slid thereon. Thus, the force for rotation generally tends to be large and the size of the valve parts also tends to be large so as to retain strength. Since the valve body and the ball seat produce a closing/opening motion while accompanying a sliding motion, the ball seat tends to sustain wear. Since the ball seat possibly hurls itself out into the flow path by dint of the pressure of the fluid when the valve body assumes the position of intermediate aperture, the ball seat has the problem of dubious durability because it requires maintenance and replacement with a new seat in the course of a prescribed duration of use.

Then, the spring return type of electric motor-operated ball valve produces an opening/closing slide motion by means of a ball valve body and, moreover, requires a spring for charging the force to be used in imparting a return motion to the valve separately from the valve body. Thus, it suffers an undue increase in the torque of rotational operation (refer to the signs C, D, and E shown in the graph of FIG. 22) and consequently in the size of a finished product to the extent of inducing a rise in the cost.

The relief valve disclosed in JP-A-HEI 10-30,420 mentioned above is a valve formed of a shape memory alloy and, therefore, endowed with a construction capable of producing an opening/closing motion solely when a fluid having an elevated temperature exceeding a prescribed level is being supplied. Moreover, the shape memory alloy is a material of low yield and high price that not only adds to the cost of the valve but also betrays deficiency in the infallibility of opening/closing operation and in the practical value.

Then, the general flow regulating valve can cope only with the predetermined flow volume and, when the predetermined flow volume is changed, necessitates a troublesome work of replacing the built-in steady flow cartridge with a cartridge conforming to the new flow volume.

This invention has been initiated in view of the problems encountered by the various conventional types of valve. One object of the present invention is to provide a valve which, by a valve body acquiring a force of stored energy, is enabled to generate an opening/closing motion with a small torque of operation, render the generation of an opening/closing motion infallible and stable, further realize a reduction in cost, materialize manufacture of the valve in compact design, excel in durability and enjoy a high practical value. A further object of the present invention is to provide a valve that enables a valve body with a water stop function to diversify functionality by acquiring the function of fixing the flow volume and deriving a varying function of setting a steady flow volume from the rotational frequency of the valve shaft.

DISCLOSURE OF THE INVENTION

This invention relates, in the type of valve intended to open/close a flow path of a fluid, to a leaf spring valve which has accommodated in a valve main body a valve body formed of a bent leaf spring, with one end of the leaf spring fastened or fixed to the valve main body side and the other end thereof fastened or fixed to a valve shaft, and a bent surface thereof disposed opposite an inlet and an outlet of the flow path each terminating into a bent end face so as to be movable into and away from the inlet and outlet of the flow path, whereby the leaf spring is displaced toward the center of a valve chamber till the inlet and outlet of the flow path are opened by rotation of the valve shaft.

In this case, the leaf spring is a spiral spring and the outer periphery of this spiral spring is opposed to the inlet and outlet of the flow path.

The leaf spring valve contemplated by this invention is provided in a valve box with a drive valve body for opening/closing or controlling the flow path. This drive valve body has a force of stored energy that is utilized in controlling its drive.

In this case, the force of stored energy of the drive valve body is accumulated in the drive valve body by the output of an actuator that is an external drive force. This force of stored energy roughly equals the valve body force of drive control.

The drive valve body is also a spiral spring. This spiral spring has one end thereof fitted inside a valve chamber of the valve box, the other end thereof fitted to a valve shaft inside the valve chamber, and the lateral face thereof disposed as opposed to and depressed against a valve seat of the valve box. By rotating the valve shaft by means of an actuator or manually, thereby displacing the spiral spring centripetally toward the valve shaft side, it is made possible to separate the lateral face of the spiral spring from the valve seat and open the outlet of the flow path on the secondary side or shift the position for fitting the spiral spring inside the valve chamber to the proximity of the inlet of the flow path on the primary side.

Further, a seal member formed of an elastic material such as rubber is integrally formed with the spiral spring at the position for sealing the valve seat.

By suitably displacing the spiral spring centripetally toward the valve shaft side by means of the valve shaft that has been rotated with an actuator or manually, the spiral spring is enabled to possess the function of facing a steady flow volume. In this case, the rotational frequency of the valve shaft is relied on to set the steady flow volume at an arbitrary level.

The leaf spring valve described above is used particularly advantageously in an air conditioning device adapted to open/close or control a pipe for supply of a fluid or to acquire the function of fixing the steady flow volume.

BEST MODE OF EMBODYING THE INVENTION

Various embodiments of applying the leaf spring as one example of this invention to a spiral spring will be described in detail based on the drawings.

Figure 1:
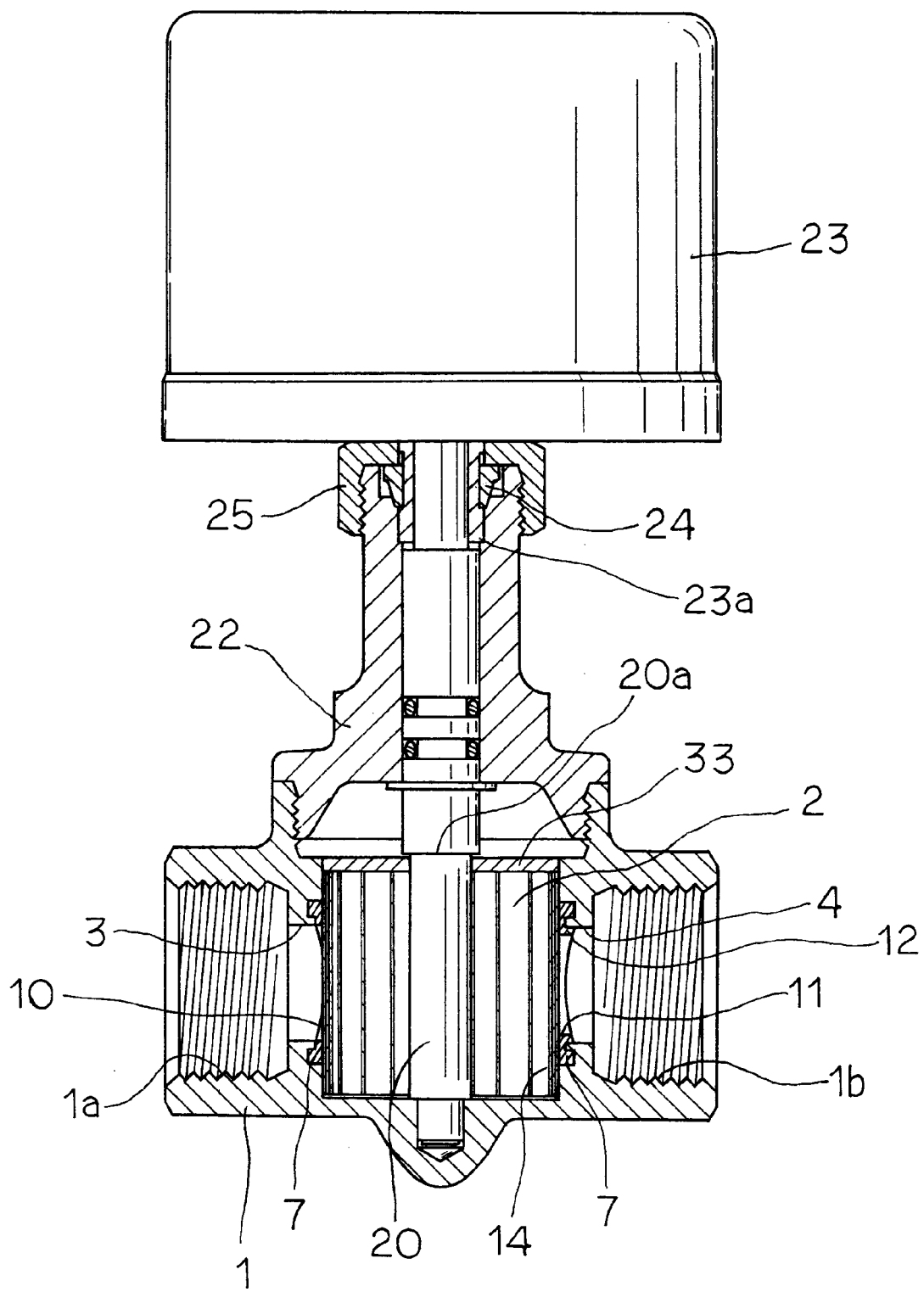
FIG. 1 is a longitudinal section illustrating an example of mounting an electric motor on a leaf spring valve according to this invention.
Figure 2:
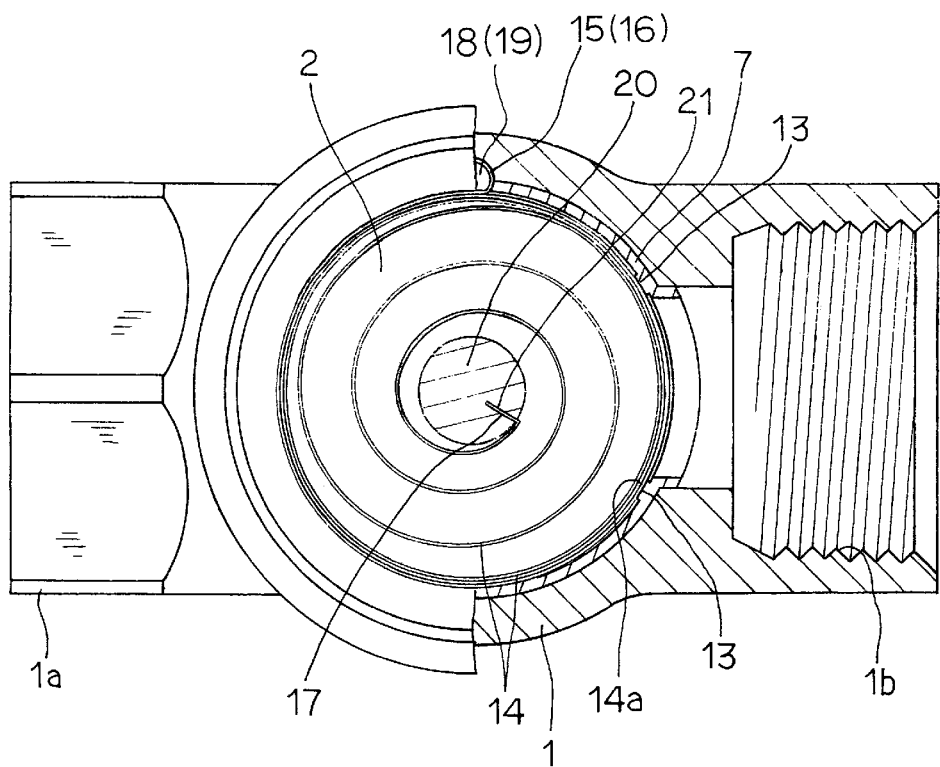
FIG. 2 is a partially cut-away magnified plan view illustrating the layout of FIG. 1 that appears after the removal of a bonnet.

FIG. 1 is a longitudinal section illustrating one example of mounting the spiral spring on the valve shaft that is rotated by driving an electric motor.

As illustrated in the diagram, a cylindrical valve chamber 2 is formed inside a valve main body 1 provided with pipe connecting parts 1a and 1b. In the valve chamber 2, a flow path inlet 3 on the primary side and a flow path outlet 4 on the secondary side are formed as respectively provided with bent end faces. Annular grooves 5 and 6 are disposed in the upper and lower parts of the flow path inlet 3 and flow path outlet 4.

Figure 5:
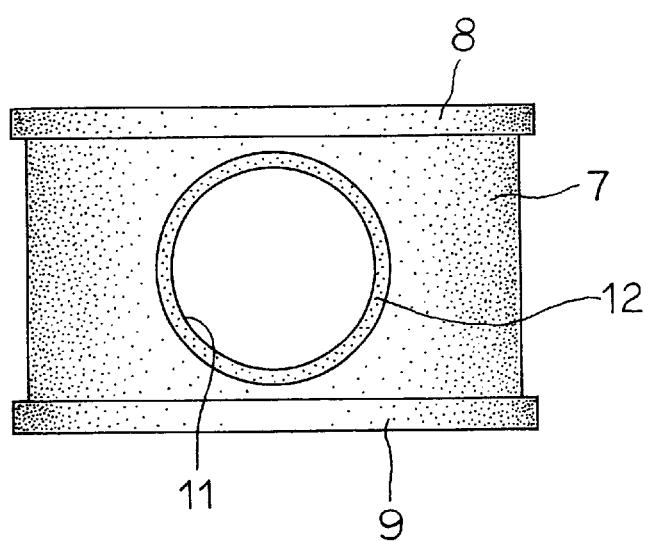
FIG. 5 is a magnified front view of a cylindrical member accommodated in a valve chamber shown in FIG. 1.
Figure 6:
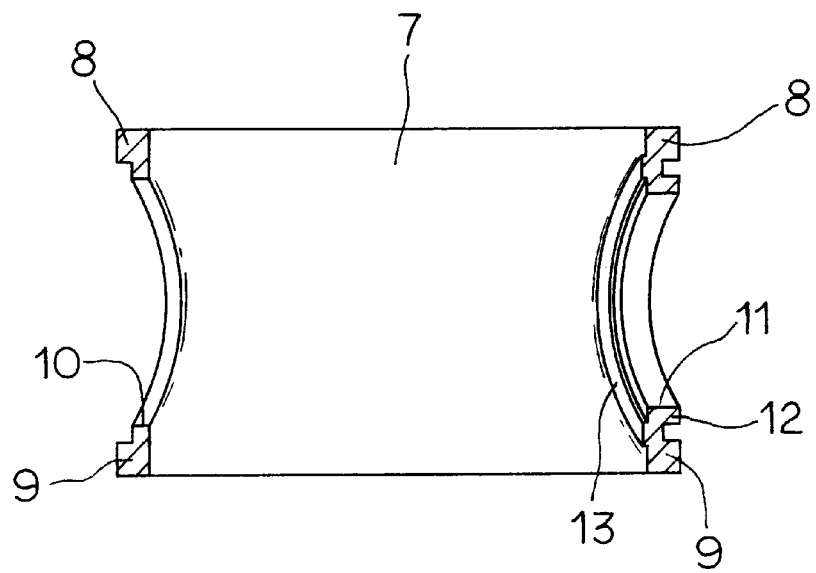
FIG. 6 is a longitudinal section of the layout of FIG. 5.
Figure 7:
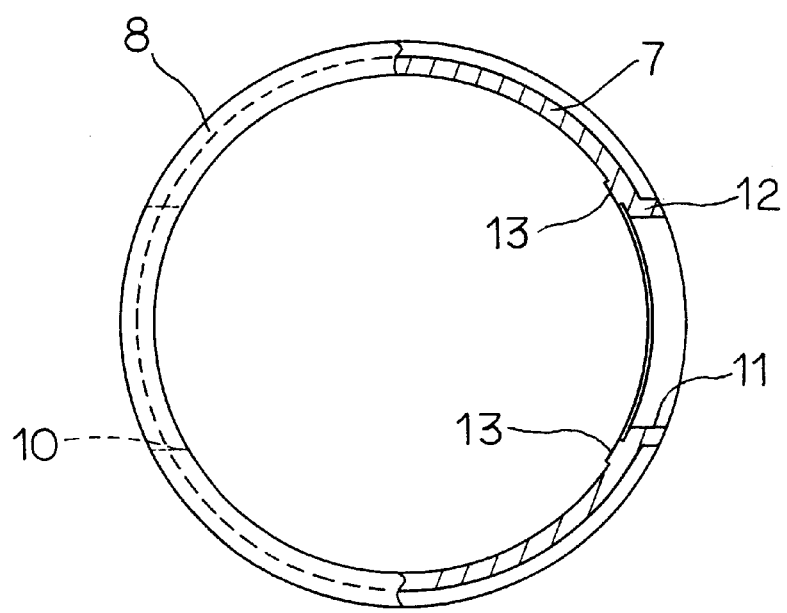
FIG. 7 is a partially cut-away plan view of the layout of FIG. 5.

With reference to FIG. 5 to FIG. 7, reference numeral 7 denotes a cylindrical member formed of rubber etc. Annular engaging projected parts 8 and 9 are disposed in the upper and the lower end parts of this cylindrical member 7. Circular opening parts 10 and 11 are formed at the left and the right of the cylindrical member 7. An annular positioning part 12 is disposed on the outer periphery side of the opening part 11 on the secondary side and a valve seat part 13 of a large wall thickness is disposed at the opening position on the internal periphery side of this site.

The mounting of the cylindrical member 7 inside the valve chamber 2 is accomplished by joining the engaging projected parts 8 and 9 of the cylindrical member 7 with the annular grooves 5 and 6 inside the valve chamber 2 and, at the same time, inserting the annular positioning part 12 formed in the cylindrical member 7 into the inner peripheral face of the flow path outlet 4 and fitting it into the valve chamber 2 as held in a baffled state.

Figure 3:
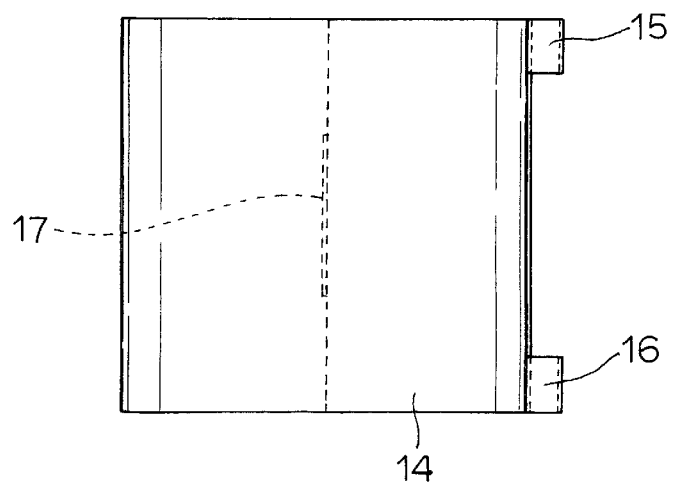
FIG. 3 is a magnified front view illustrating a spiral spring accommodated in a valve main body shown in FIG. 1.
Figure 4:
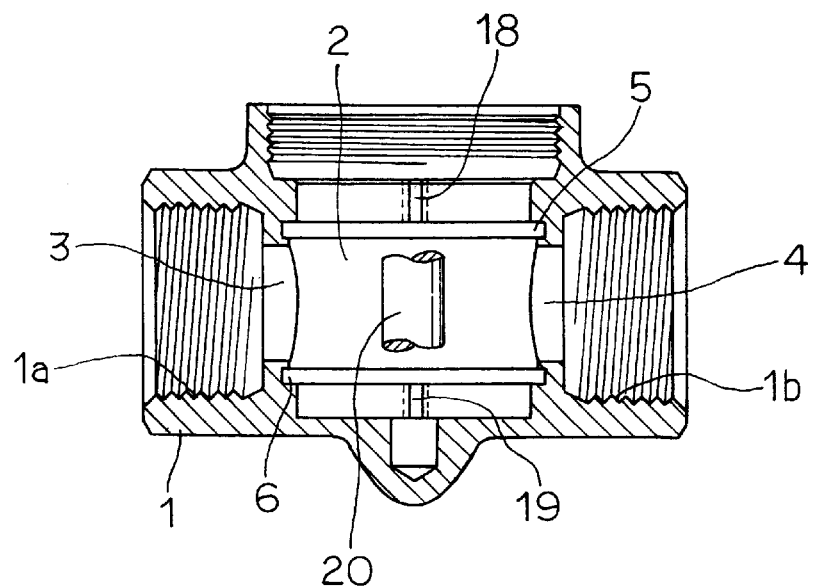
FIG. 4 is a longitudinal section of the valve main body shown in FIG. 1.

With reference to FIG. 3, reference numeral 14 denotes a spiral spring (valve body) formed of a metal such as stainless steel having corrosion resistance. This spiral spring 14 is provided on the outer end thereof with engaging parts 15 and 16 formed by extending the upper and lower parts of the outer end and bending the terminals outwardly each in the shape of three sides of a square or a circle and on the inner end thereof with a rectangular folded piece 17 directed inwardly. The engaging parts 15 and 16 are inserted in inserting grooves 18 and 19 disposed above and beneath the valve chamber 2. The folded piece 17 is inserted in a slit 21 formed in a valve shaft 20. The spiral sp ring 14 is mounted inside the valve chamber 2 and, at the same time, the spiral spring 14 and the valve shaft 20 are interlocked. In this case, the spiral spring 14 is accommodated inside the valve chamber 2 in the state retaining the force of stored energy.

Figure 8:
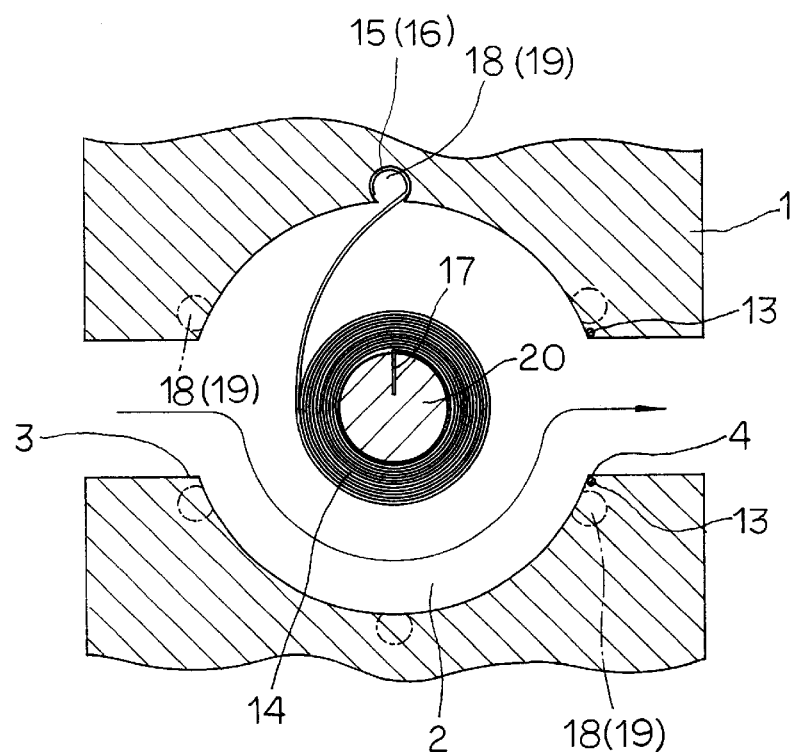
FIG. 8 is an explanatory conceptual diagram illustrating one example of the opened state of the leaf spring according to this invention.
Figure 9:
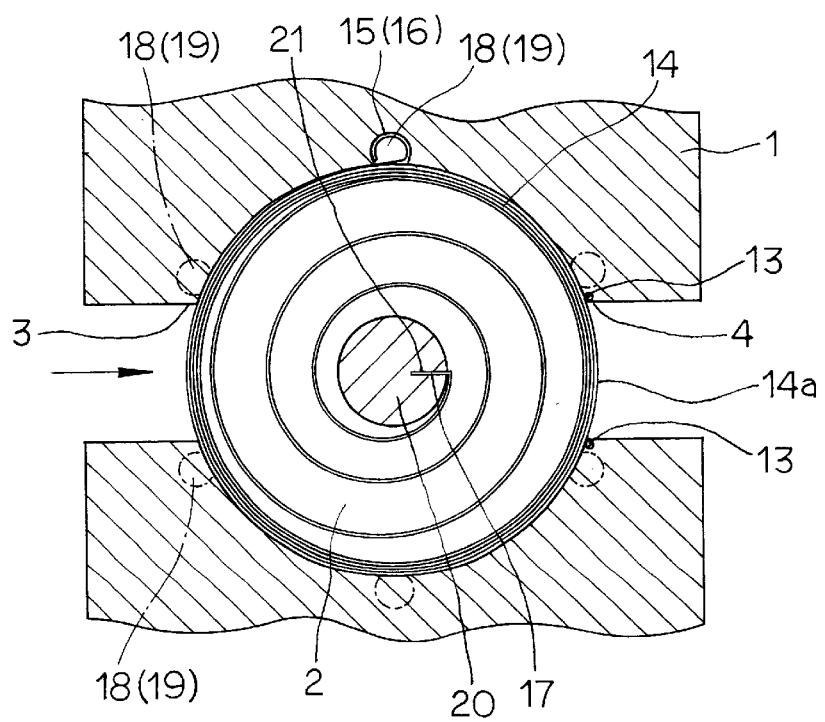
FIG. 9 is an explanatory conceptual diagram illustrating the closed state of the layout of FIG. 8.

Advantageously, by disposing a plurality of such inserting grooves 18 and 19 inside the valve chamber 2 as illustrated in FIG. 8 and FIG. 9 and suitably selecting the position for setting the outer end of the spiral spring 14, the spiral spring 14 is enabled to be set at the position such that the flow path inlet will be infallibly opened and closed.

With reference to FIG. 1, a discoid spring holder 33 is set in a stepped part 20a of the valve shaft 20 inserted inside the valve main body 1 as supported at the upper and lower ends to prevent the spiral spring 14 from idly moving up and down. A bonnet 22 is helically fixed to the upper end of the valve main body 1. A unidirectionally or bidirectionally rotating actuator 23 is fixed at the upper end of the bonnet 22.

The fixing means adopted herein comprises a connecting member 23a provided in the lower part of the actuator 23, a split ring 24 and a packing nut 25, whereby the fixing required is accomplished by tightening the packing nut 25 on the connecting member 23a through the split ring 24. It does not need to be limited to the particular arrangement just described but may be properly selected from among various fixing means in popular use.

Though the operation of the actuator 23 adopted herein is not illustrated in the drawings, it transmits the driving force of an electric motor to an output shaft via a gear mechanism and transmits the driving force of the output shaft to the valve shaft 20 to make the valve shaft 20 rotatable. The valve shaft 20 and the spiral spring 14 are interlocked by inserting the folded piece 17 of the spiral spring 14 into the slit 21 of the valve shaft 20 and inserting the engaging parts 15 and 16 of the spiral spring 14 into the inserting grooves 18 and 19 in the valve chamber 2. The rotation of the valve shaft 20 by the actuator 23 is relied on to tighten the spiral spring 14, displace the spiral spring 14 toward the center of the valve chamber 2, and open the flow path inlet 3 and outlet 4.

In the case of the motor-operated valve, when the power connection is broken, a bent surface 14a of the spiral spring 14 is caused to contact the flow path inlet 3 and outlet 4 by dint of the depressing force resulting from the release of the spiral spring 14 and, at the same time, the bent surface 14a in particular is made by the depressing force of the pressure of fluid to seal the valve seat part 13 of the cylindrical member 7 by tight contact therewith till the flow path outlet 4 is closed.

Incidentally, since the function of the valve consists in opening and closing the path outlet 4, the bent surface 14a of the spiral spring 14 does not always need to contact the flow path inlet 3.

The embodiment described above has illustrated one example of the spring return type electric motor-operated valve that is opened/closed by the driving force of the actuator 23. The valve contemplated by this invention does not need to be limited to this particular embodiment. In the case of the manually operated valve, the handle or locking mechanism serving to lock the valve shaft is released using the force of the spiral spring for rewinding to thereby automatically close the flow path inlet and outlet.

Figure 12:
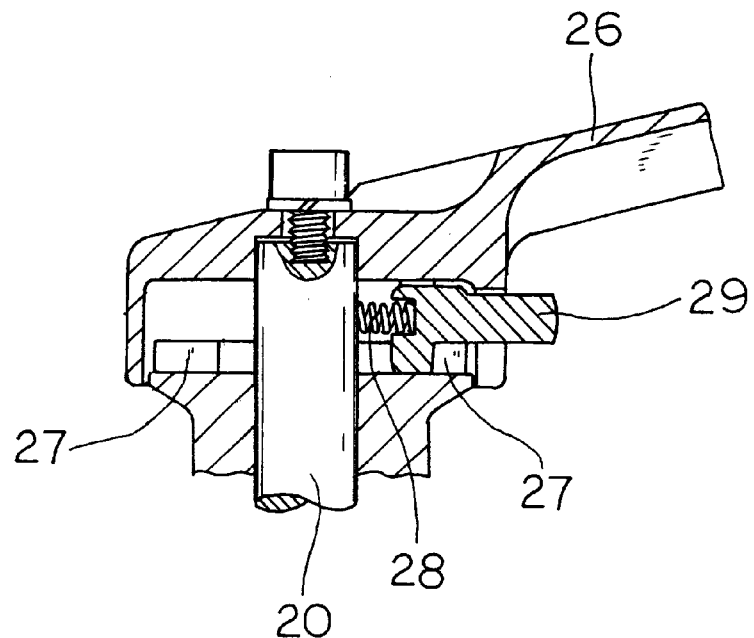
FIG. 12 is a partial section of a lock mechanism illustrating one example of the application of the leaf spring valve of this invention to a manually operated valve.
Figure 13:
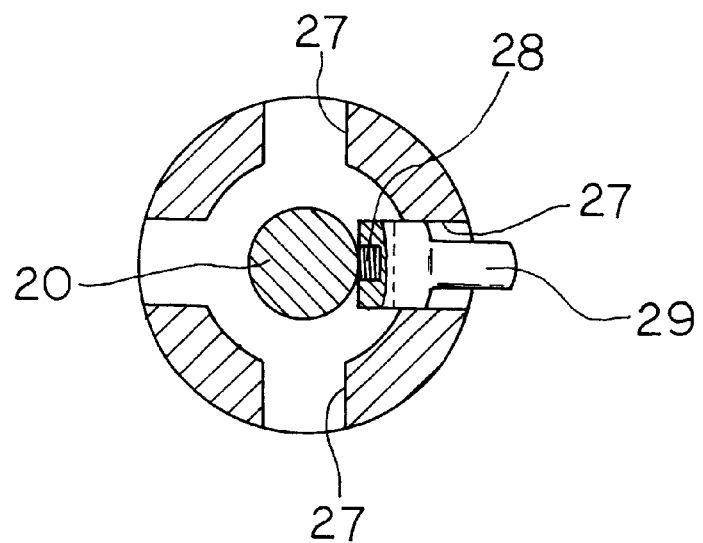
FIG. 13 is a plan section illustrating the locked state of the layout of FIG. 12.

Further, in the case of the manually-operated valve, a handle 26 is disposed on the upper end of the valve shaft 20 and a lock pin 29 is disposed so as to be inserted by depression into one of a plurality of engaging grooves 27 provided at the upper end of the valve main body 1 through a spring 28 as illustrated in FIG. 12 and FIG. 13, whereby the lock pin 29 is locked into a relevant engaging groove 27 by the snapping force of the spring 28 when the lock pin 29 is depressed and the handle 26 is simultaneously rotated and the lock pin 29 is released at a position at which this rotation is stopped. Thus, the spiral spring 14 in the opened state can be locked fast at a proper position. The closure of the flow path is automatically attained by releasing the lock, thereby allowing the bent surface of the spiral spring to close the flow path inlet and outlet by dint of the rewinding force of the spiral spring. Plural engaging grooves 27 are disposed at locking positions to be arbitrarily selected.

To adduce another example of the manually operated valve, in the case of the manually operated valve that initiates a manual operation by depressing the valve shaft with the handle, the rotation of this handle displaces the spiral spring toward the center of the valve chamber till the flow path inlet and outlet are opened. When the depression on the handle is released, the locking member is locked fast by the snapping force of the spring till the spiral spring 14 in the open state is fixed at a proper position. Otherwise, by adopting a construction which rotates the handle with a an undulating clutch mechanism till the spiral spring is fixed at a proper position, the leaf spring valve contemplated by this invention may be applied to a manually-operated valve.

Then, the operation of the embodiment described above will be described below based on the explanatory conceptual diagrams of FIG. 8 and FIG. 9. First, with reference to FIG. 9, when the actuator 23 is not being driven with an automatic valve or when the handle is set at a closed position with a manually operated valve, the rewinding force of the spiral spring 14 presses the outer peripheral surface, i.e. the bent surface 14a of the spiral spring 14, fast against the valve seat part 13 till the flow path inlet 4 is closed with the spiral spring 14.

In this case, the closure is attained infallibly because the bent surface 14a presses the valve seat part 13 against the inner surface of the valve main body 1.

When the actuator 23 or the handle is driven in the counterclockwise direction to rotate the valve shaft 20 and tighten the spiral spring 14, the bent surface 14a of the spiral spring 14 departs from the valve seat part 13 till the flow path outlet 4 is opened.

When the power connection is broken or the lock of the handle is released in that state, the spiral spring 14 is released till the valve shaft 20 and the bent surface 14a return to the state shown in FIG. 9.

In this case, the spiral spring 14 and the valve seat part 13 avoid generating wear and enjoy highly satisfactory durability because they do not slide in the circumferential direction unlike in the case of a rotary valve such as the ball valve, but make/break contact in the non-slide pattern. When the valve body is a spiral spring, it enjoys a satisfactory operating property because the torque for the tightening action does not need to be very large.

In the case of the present embodiment, the spiral spring 14 is tightened counterclockwise as illustrated in FIG. 8, namely in the same direction as the ordinary valve is opened/closed. Optionally, it may be tightened in the opposite direction.

Figure 10:
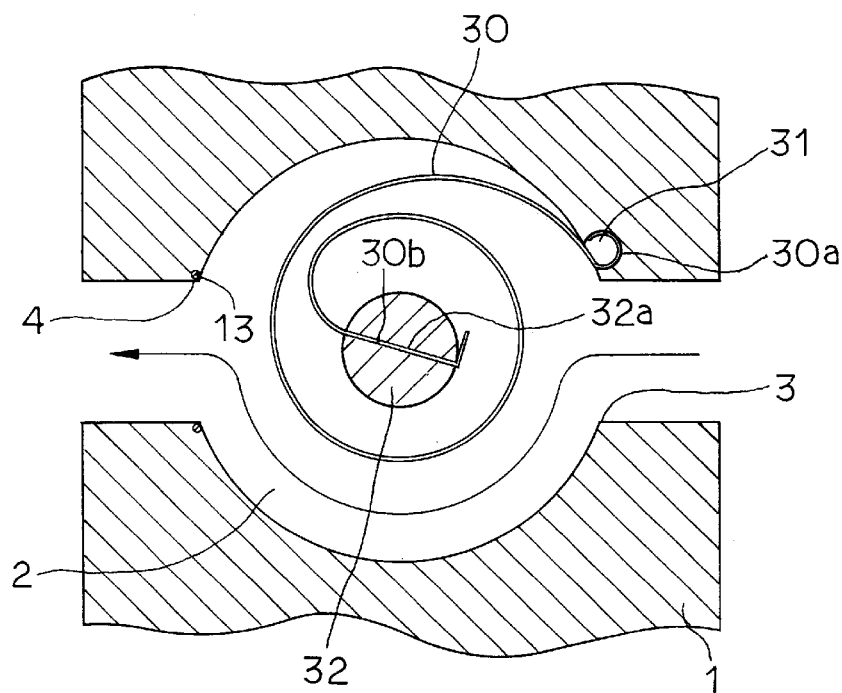
FIG. 10 is an explanatory conceptual diagram illustrating another example of the opened state of the leaf spring according to this invention.
Figure 11:
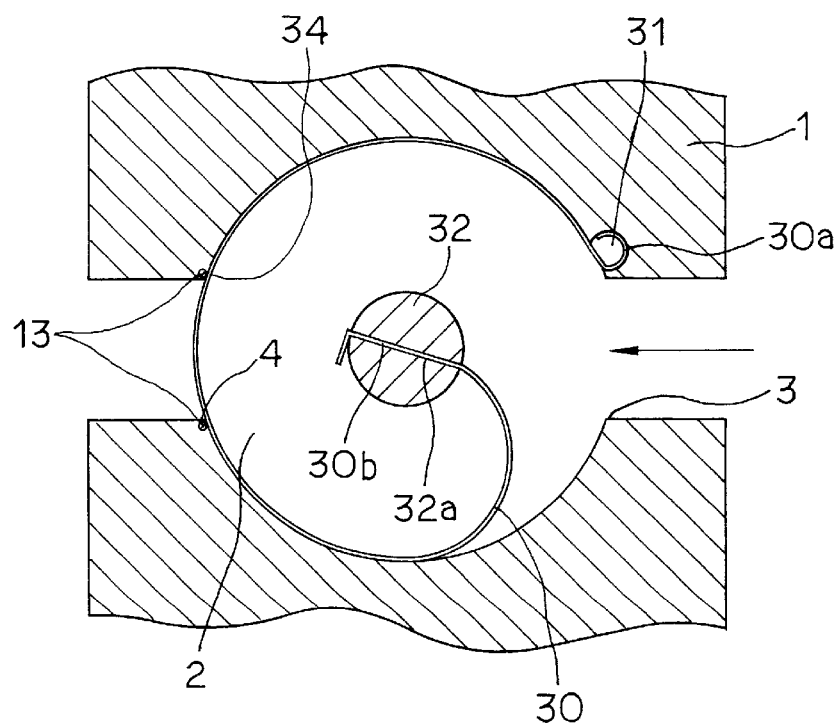
FIG. 11 is an explanatory conceptual diagram illustrating the closed state of the layout of FIG. 10.

FIG. 10 and FIG. 11 are explanatory conceptual diagrams illustrating another example of the leaf spring. When an outer end 30a of a leaf spring (valve body) 30 is mounted as inserted in an inserting groove 31 of the valve main body 1 and an inner end 30b thereof is mounted as inserted into a slit 32a of a valve shaft 32 and the valve shaft 32 is rotated automatically or manually, the flow path outlet 4 is opened as illustrated in FIG. 10 and a bent surface 34 of the spring 30 is pressed by the rewinding force of the spring 30 against the valve seat part 13 till the flow path outlet 4 is closed infallibly.

To adduce another example of the leaf spring valve contemplated by this invention, a rubber member (not illustrated) may be fixed by baking or adhesion on the peripheral position of the bent surface 14a opposed to the flow path outlet 4 of the leaf spring such as a spiral spring and the flow path outlet may be opened/closed by making/breaking contact between the rubber member and the flow path outlet of the valve chamber, instead of disposing the cylindrical member 7 inside the valve chamber 2 of the valve main body 1. In the case of this construction, the valve chamber may be simplified in shape and the engaging part of the leaf spring with the valve chamber may be disposed over the entire width of the spring or at a suitable position, instead of being projected in a split state like the components indicated by reference numerals 15 and 16 in FIG. 3.

The means for setting the outer and inner ends of the spiral spring 14 is may be obtained, otherwise than in the example cited above, by firmly implanting or supporting a shaft inside the valve main body 1 and fastening the outer end of the spiral spring to the shaft or by disposing an outwardly directed pin in the valve shaft and fastening this pin to a hole formed in the inner end of the spiral spring. It may be arbitrarily adapted to suit the occasion.

Then, the embodiment of the leaf spring valve having a built-in drive valve body therein will be described in detail below in accordance with FIG. 14 to FIG. 24.

Since this embodiment has nearly the same constructions, operations, and effects as in the embodiment described with reference to FIG. 1 to FIG. 13, particularly different parts of the embodiment will be described in detail below.

Figure 14:
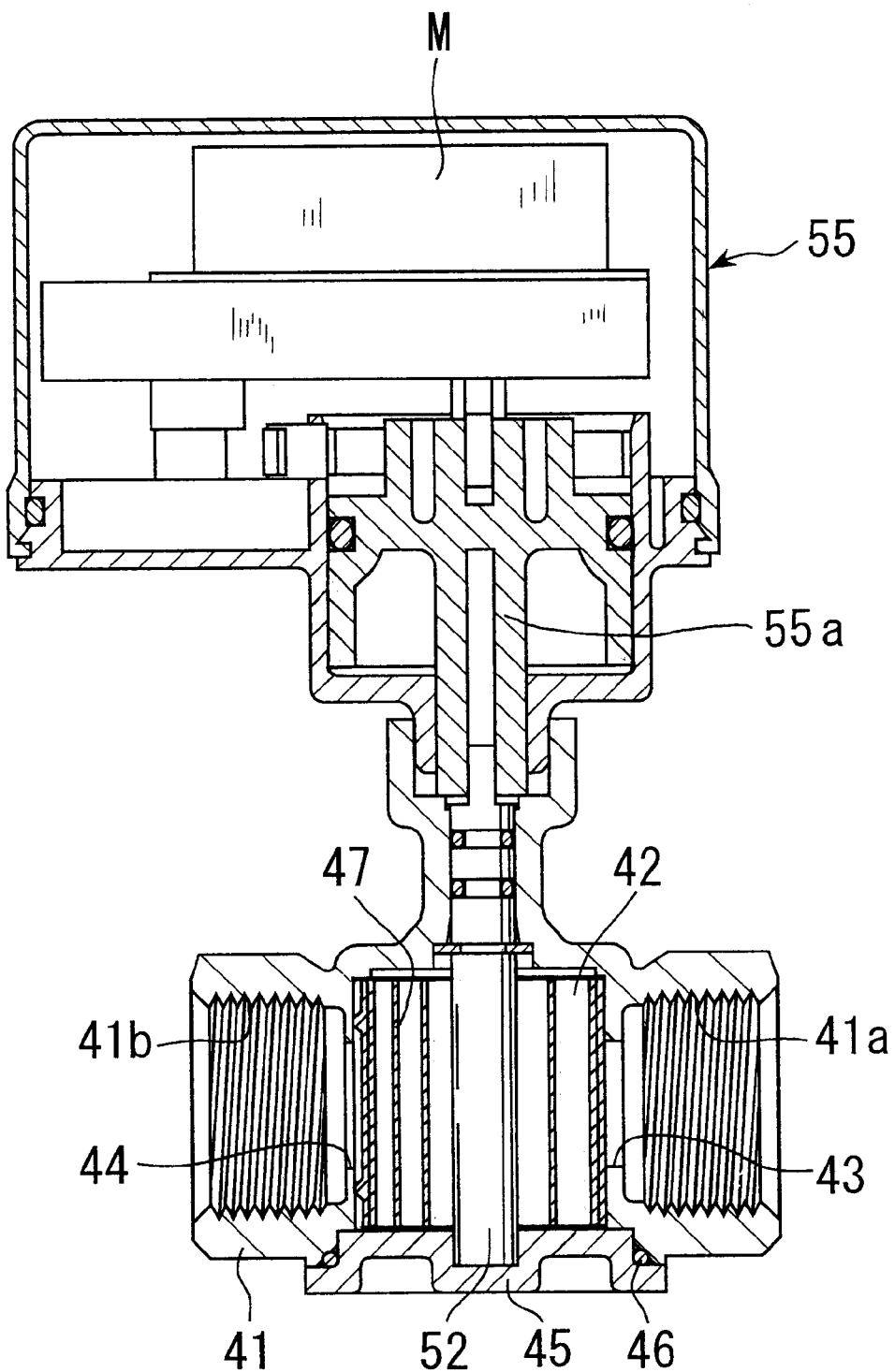
FIG. 14 is a longitudinal section illustrating one example of the leaf spring valve having a built-in drive valve body according to this invention.

FIG. 14 is a longitudinal section illustrating one example of the valve having a built-in drive valve body that is a spiral ring and a valve shaft rotated by the driving force of an electric motor.

Figure 15:
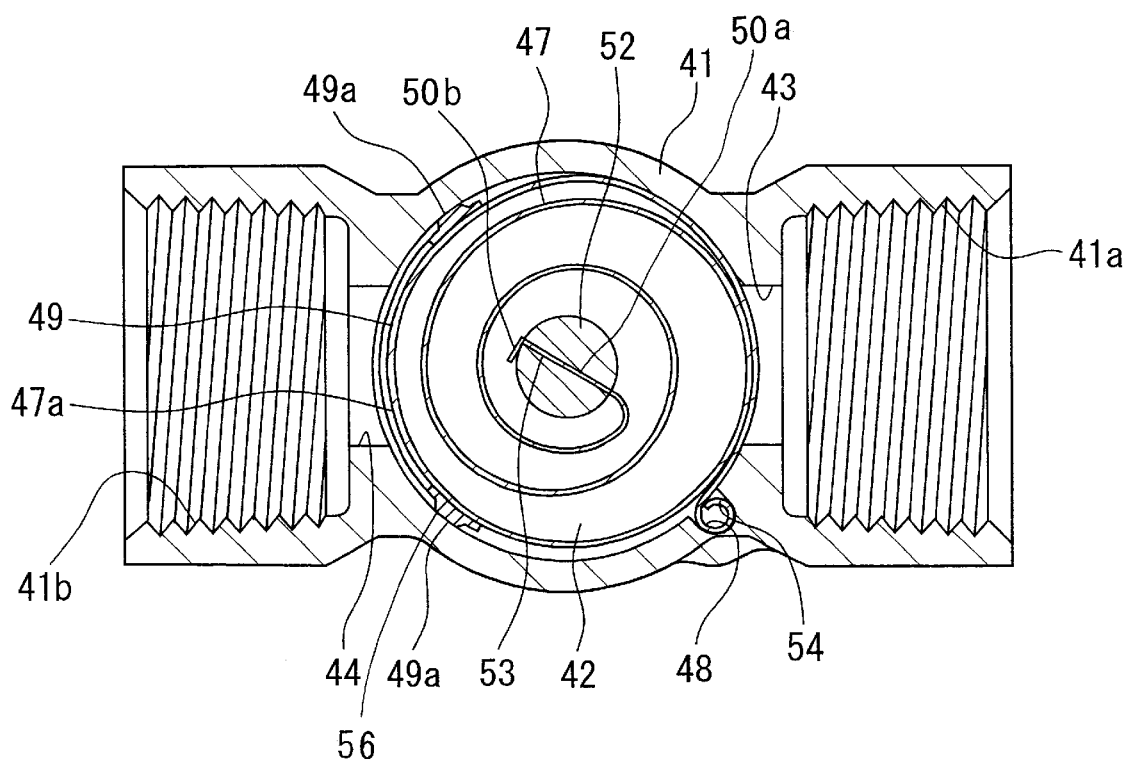
FIG. 15 is a magnified section taken transversely across FIG. 14.
Figure 24:
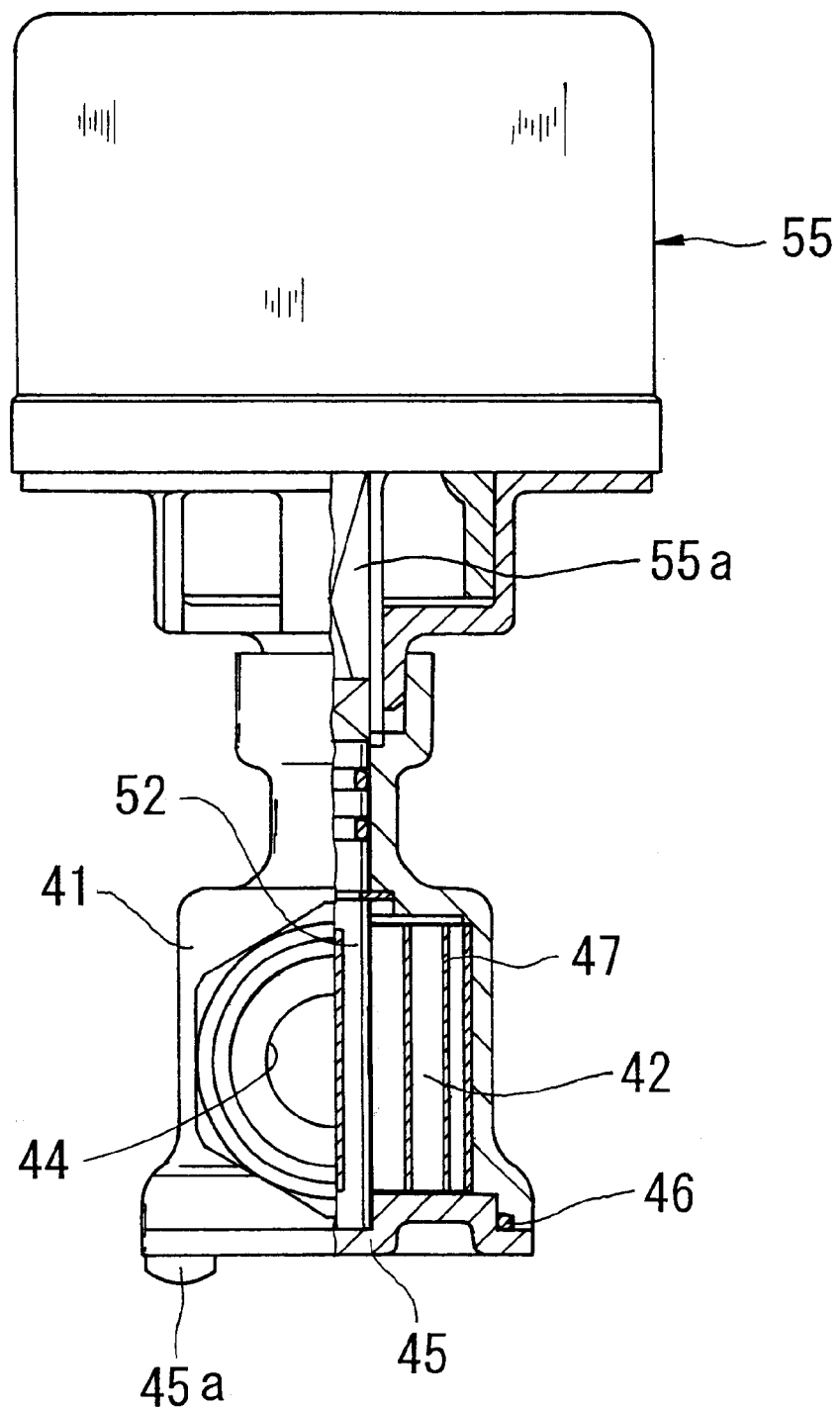
FIG. 24 is a partially cut-away lateral view of the valve shown in FIG. 14.

With reference to FIG. 14, FIG. 15, and FIG. 24, reference numeral 41 denotes a valve box provided with pipe connecting parts 41a and 41b. A valve chamber 42 having an inter peripheral surface shaped like a cylinder is disposed inside this valve box 41, and a flow path inlet 43 on the primary side and a flow path outlet 44 on the secondary side are disposed inside this valve chamber 42. A cap 45 for covering the valve chamber is fastened to the lower part of the valve box 41 with set screws 45a through an O-ring 46.

To be specific, the valve is so constructed as to permit insertion of a spiral spring 47 into the valve box 41 from below as will be specifically described herein below. This construction has the valve box and a bonnet formed integrally and obviates the necessity for parts such as a spring holder and enjoys compactness and a satisfactory sealing property.

In the diagram, reference numeral 47 denotes a drive valve body that is disposed inside the valve box 41 for the purpose of opening/closing or controlling the flow path. This drive valve body 47 has the force of stored energy in it and is enabled by this force of stored energy to drive itself till the flow path inlet and outlet are closed.

The force of stored energy of the drive valve body 47 is accumulated in it substantially in the absence of friction by the output of an actuator 55, i.e. an external drive force, equipped with a built-in motor M and disposed on the valve box 41, or by a manual operation. This force of stored energy is approximated closely to the force of drive control of the drive valve body 47.

Figure 17:
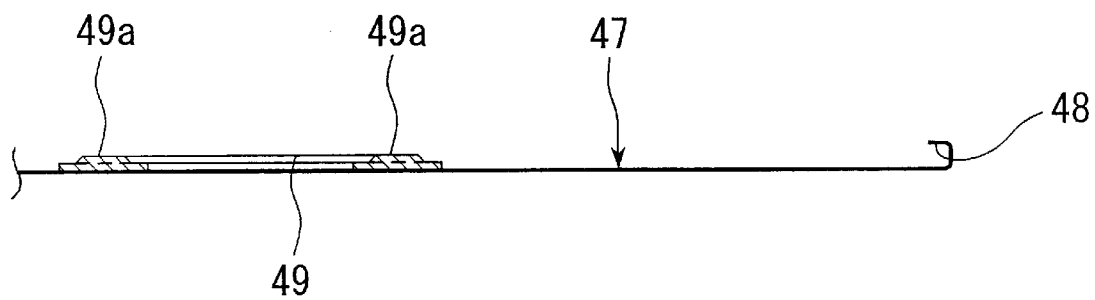
FIG. 17 is a cross section taken through FIG. 16 along line A—A.
Figure 18:
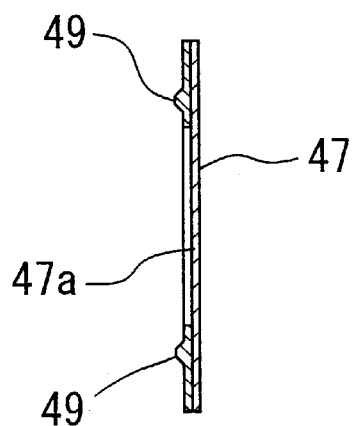
FIG. 18 is a cross section taken through FIG. 16 along line B—B.
Figure 19:
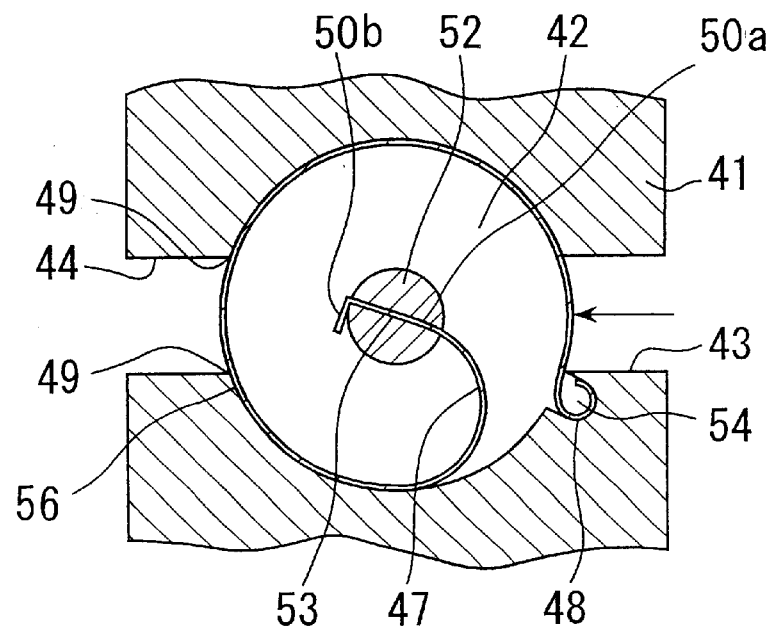
FIG. 19 is an explanatory conceptual diagram of the layout of FIG. 14.

The drive valve body 47 in the present embodiment is a spiral spring 47 that is illustrated in FIG. 15 to FIG. 19. This spiral spring 47 is formed of a metal such as stainless steel that has resistance to corrosion. This spiral spring 47 is provided at the outer end thereof with an outwardly directed engaging part 48 having a cross section of the shape of three sides of a square or a circle and at the inner end thereof with a folded piece 50a terminating into an engaging part 50b. Commendably, the engaging part 48 is fastened at a fixing (engaging) position 54 formed in the proximity of the flow path inlet 43 on the primary side as illustrated in FIG. 15 and FIG. 19.

The reason for adopting this particular construction is that the radius of curvature of the spiral spring 47 is stabilized on the opposite side of an engaging groove 54 of the valve box 41 with the center of the spiral spring 47 as the axis of symmetry and, by disposing the stabilized lateral surface as opposed to a valve seat 56, the lateral surface is enabled to acquire an improved sealing quality for the valve seat 56.

Further, since the engaging groove 54 is disposed at such a position as allows the lateral surface of the part of the spiral spring 47 connected to the engaging part 48 to close the flow path inlet 43 on the primary side during the course of closing the valve as illustrated in FIG. 15, the fluid during the course of opening the flow path is enabled to flow smoothly to the flow path outlet 44 on the secondary side without being engulfed into the swirling part of the spiral spring 47.

Figure 23:
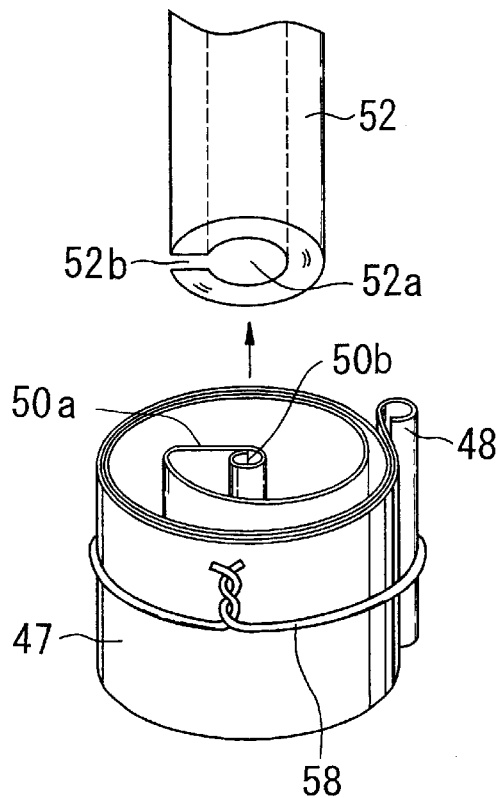
FIG. 23 is a perspective view illustrating the method for inserting the spiral spring into the valve shaft in the layout of FIG. 14.

Another embodiment of the assemblage of this spiral spring 47 will be illustrated in FIG. 23. FIG. 23 depicts an operation of accommodating the spiral spring 47 in the state of retaining the force of stored energy into the interior of the valve chamber 42 by a procedure which comprises binding the spiral spring 47 constricted to a diameter smaller than the inside diameter of the valve chamber 42 with a ring or binding member 58 for a case, inserting the spiral spring 47 into the valve box 41 from below, fastening the engaging part 48 to the engaging groove 54, inserting the folded piece 50a and engaging part 50b respectively into a slit 52b and an inserting groove 52a of the valve shaft 52, and thereafter removing the ring or binding member 58, thereby causing the lateral surface of the spiral spring 47 as held in the constricted state to be pressed against the valve seat 56 of the valve box 41 till the closed state is assumed, and allowing the spiral spring 47 to be prepared for accommodation in the valve chamber 42. This spiral spring 47 is endowed with such thickness and rigidity as exceed their respectively prescribed levels enough to avoid being shaken under the influence of the energy of the fluid flowing the interior of the valve. The thickness in the present case is about 0.2 mm.

Figure 16:
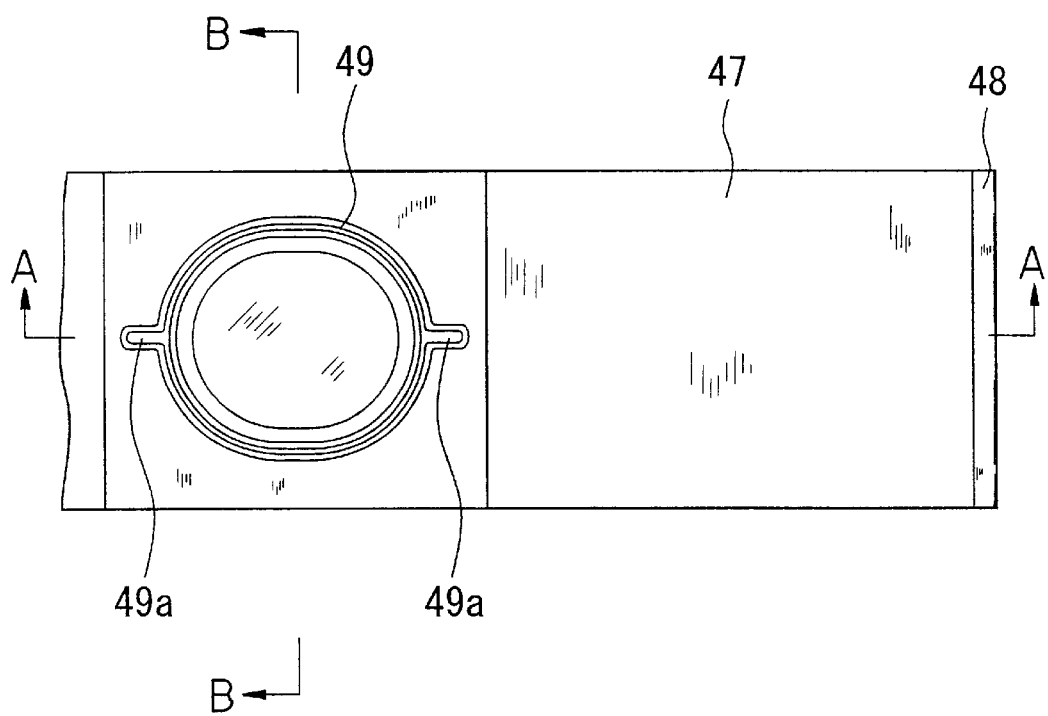
FIG. 16 is a partially cut-away expansion plan illustrating the drive valve body of FIG. 14 in an expanded state.

The valve chamber 42 is provided in the flow path outlet 44 on the secondary side with the valve seat 56, and a sealing member 49 pressed against this valve seat 56 at the sealing position is disposed integrally at a valve seat sealing position 47a of the spiral spring 47. To be specific, the sealing member 49 is formed of a resilient material such as rubber and integrally fixed to the spiral spring 47 by baking as illustrated in FIG. 16 to FIG. 18. This sealing member 49 assumes such an annular elliptically projected shape as increases the pressure of the sealing surface of the valve seat and allows the required sealing to be obtained with added infallibility. Further, the sealing member 49 is provided at the symmetric positions of the annular shape thereof with projected parts 49a in order that the sealing member, when the spiral spring 47 is separated from the valve seat 56, may be easily peeled from the valve seat. Thus, the spiral spring 47 may be infallibly separated from the surface of the valve seat 56.

Figure 20:
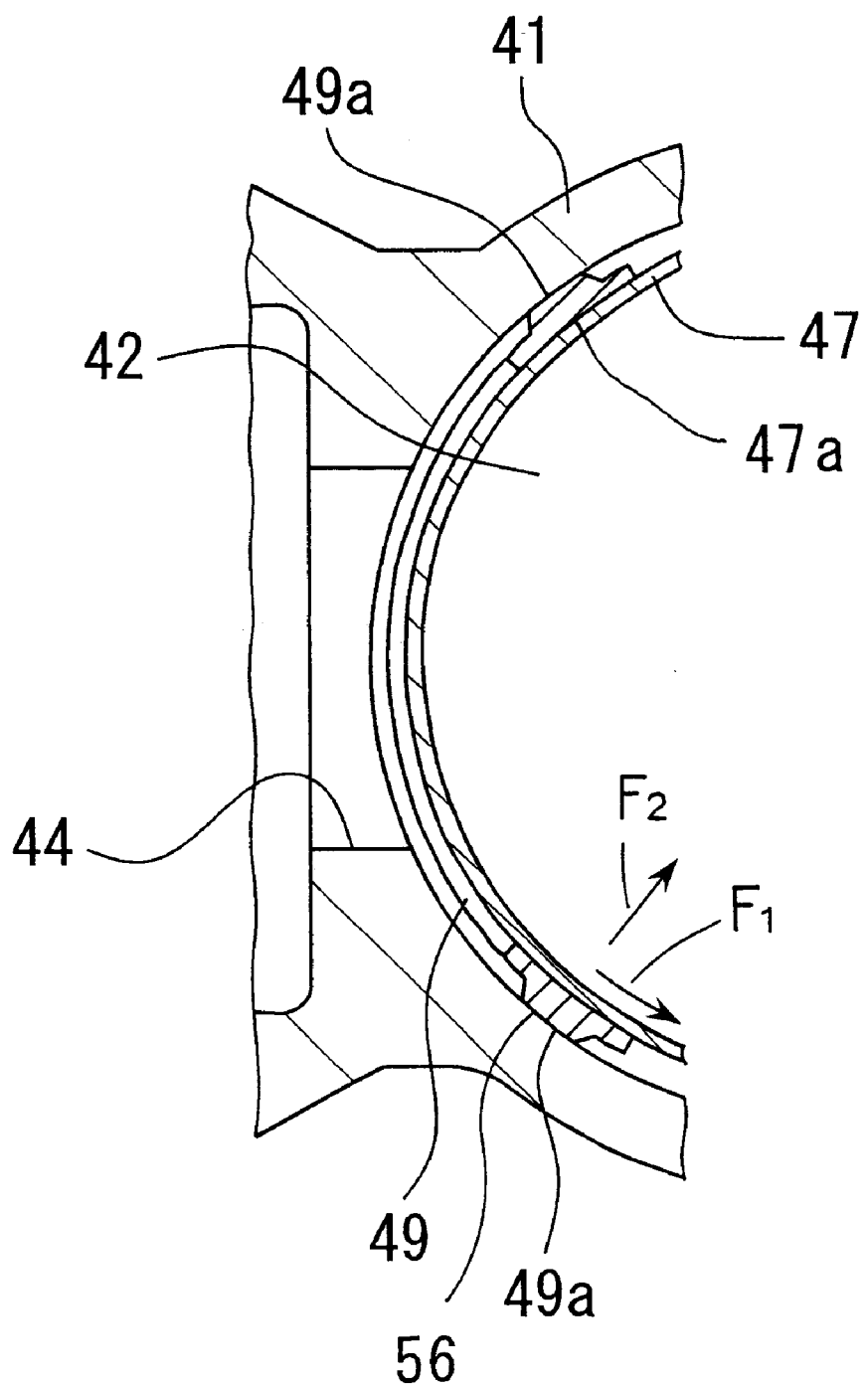
FIG. 20 is a partially magnified diagram illustrating the state of initial motion for separating the drive valve body of FIG. 14.
Figure 21:
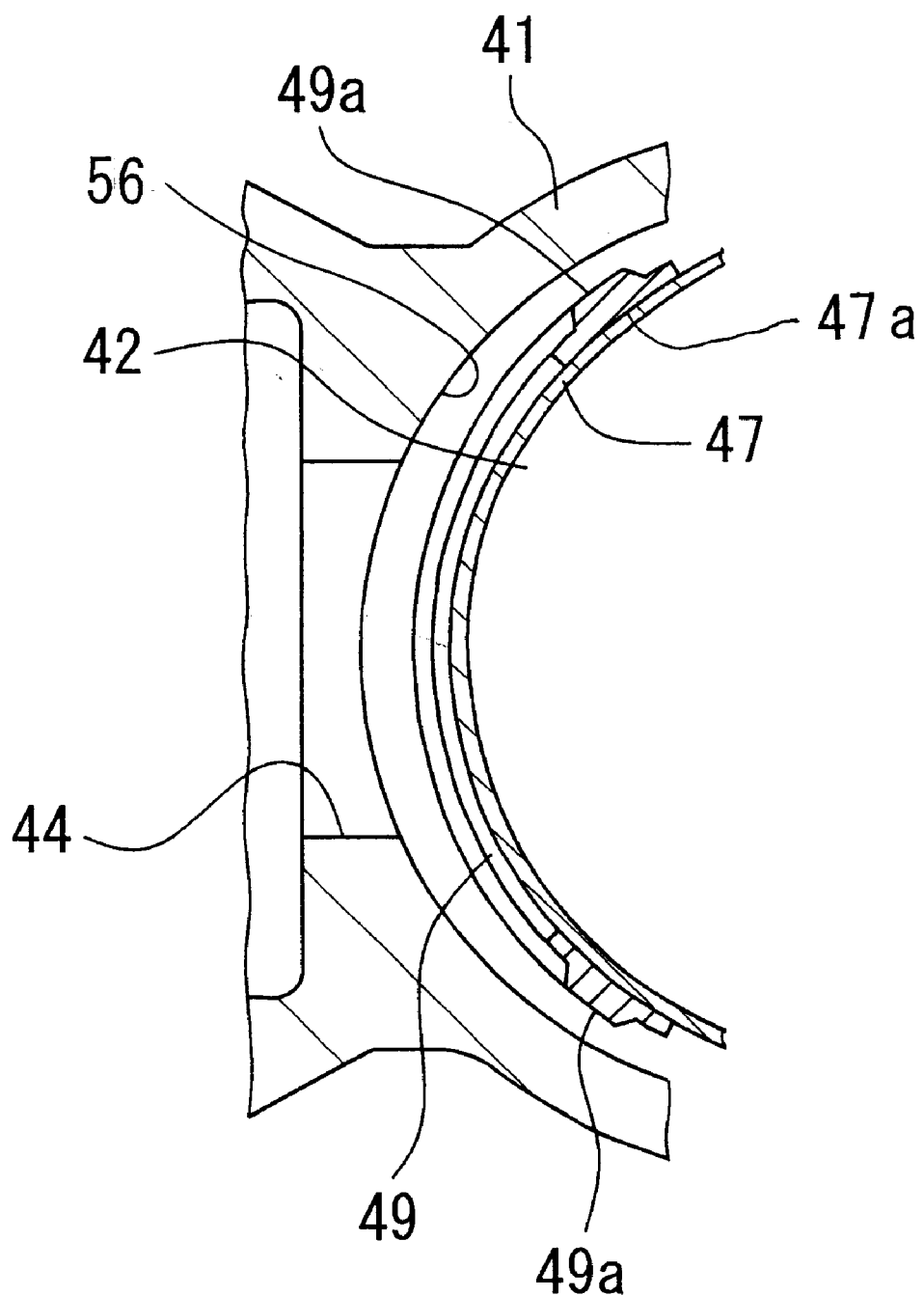
FIG. 21 is a partially magnified diagram illustrating the drive valve body of FIG. 20 in the separated state.

Further, this sealing member 49 is so formed as acquires a thickness enough to absorb a delicate change in the radius of curvature of the spiral spring 47 and secures the prescribed performance of valve seat sealing, Further, in the construction illustrated in FIG. 20 and FIG. 21, when the spiral spring 47 is actuated in the opening direction, the force $F_1$ exerted in the circumferential direction acts on the seal point of the valve body 47 in the same manner as in the ball of an ordinary ball valve and, in addition thereto, the force $F_2$ exerted in the centripetal direction of the valve body 47 similarly acts on the seal point. During the course of initial opening actuation of the valve, this seal point in the state separated from the valve seat 56 shifts in the circumferential direction and, as a result, the sliding motion encounters virtually no resistance.

Figure 22:
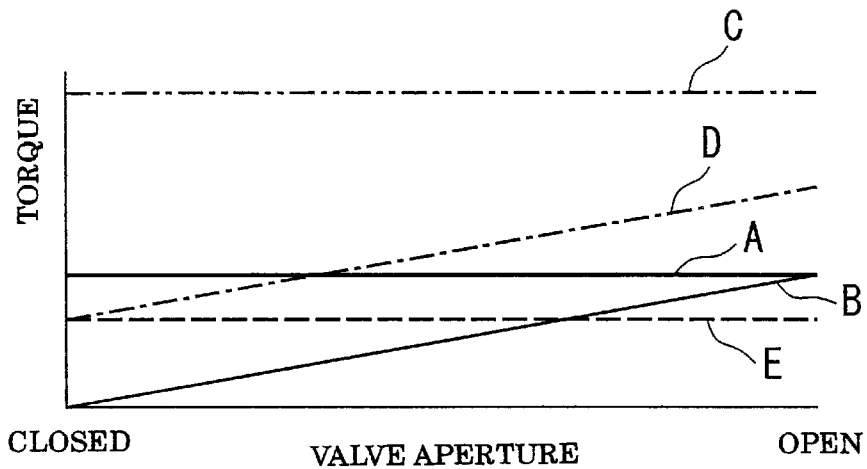
FIG. 22 is a graph for comparison with the conventional examples.

Thus, the miniaturization of the motor M in the actuator 55 is realized as surmised from FIG. 22 and clearly inferred from the comparison with the conventional spring return type valve.

This diagram depicts that the conventional valve torque E and the conventional spring torque D are consolidated and consequently made to require the conventional actuator torque C. In contrast to the conventional construction, since the construction of the present embodiment has only to require the spiral spring torque B, the present construction requires only the actuator torque A and realizes miniaturization of the actuator and reduction in cost.

Reference numeral 53 appearing in FIG. 15 and FIG. 19 denotes a through-hole formed in the valve shaft 52. The inner end part of the spiral spring 47 is inserted into this through-hole till it is fixed to the valve shaft 52.

The operation of the present embodiment is roughly similar to that of the first embodiment described above. When the spiral spring 47 which is a drive valve body is rolled in from the output of the actuator 5 via a transmitting member 55a, this spiral spring 47 accumulates energy while entailing practically no sliding motion and, at the same time, the sealing member 49 fixed to the spiral spring 47 separates from the valve seat 56 and opens the flow path outlet 44 on the secondary side till an opened state is assumed. In this case, the force of stored energy of the spiral spring 47 approximately equals the force of drive control of the spiral spring 47.

Then, when the spiral spring 47 is manually or automatically relieved of the rolled state, the force of stored energy of the spiral spring 47 presses the sealing member 49 against the valve seat 56 in a sealed state and closes the flow path outlet 44 on the secondary side infallibly.

Further, by causing the spiral spring 47 to be suitably displaced centripetally toward the valve shaft 52 with the valve shaft 52 rotated by the actuator 55 or manually, the spiral spring 47 is enabled to manifest the function of steady flow volume. In this case, the steady flow volume can be set at an arbitrary level by the rotational frequency of the valve shaft 52.

Figure 27:
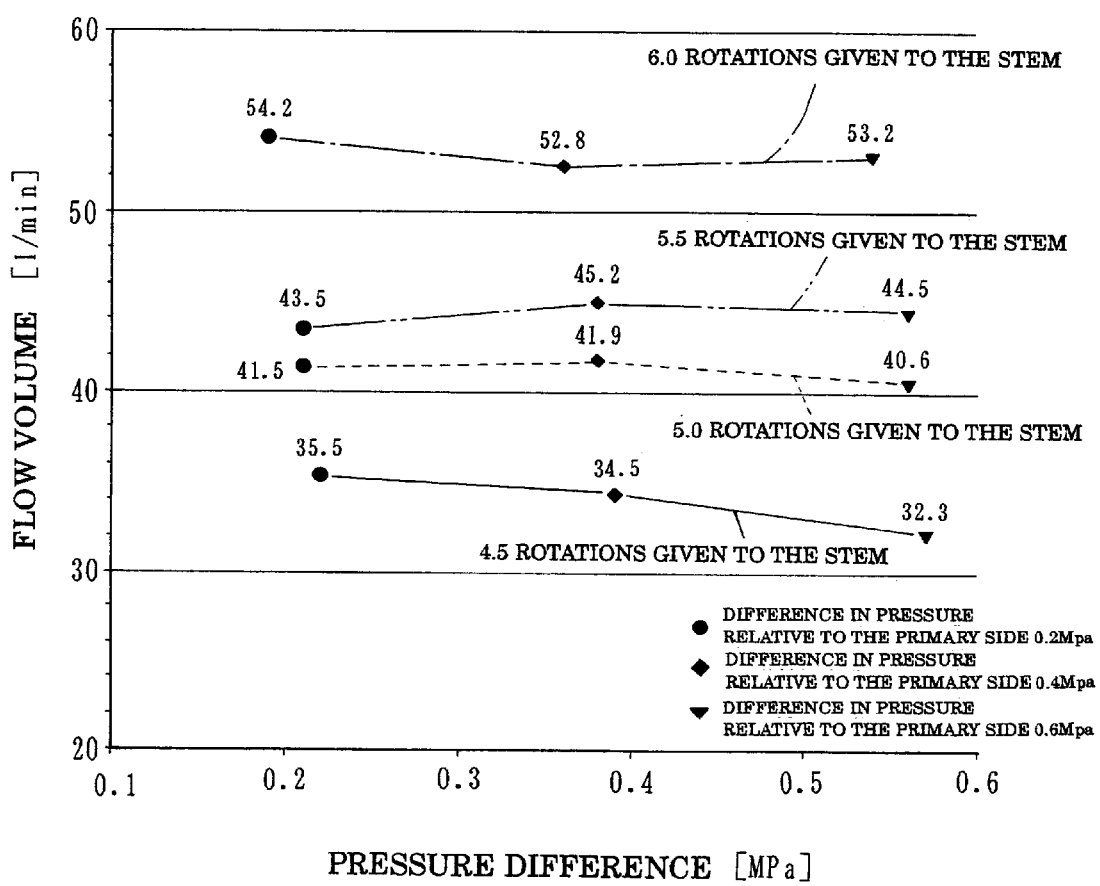
FIG. 27 is a graph showing the relation between the pressure difference and the flow volume shown by the valve of FIG. 26 when the rotational frequency of the valve shaft is changed.

FIG. 27 graphically shows the relation between the pressure difference and the flow volume found by varying the rotational frequency of the valve shaft 52 with the primary pressure kept constant. In this case, the nominal diameter of the leaf spring valve is 1B.

As a result, when the valve shaft 52 is given 6.0 rotations and fixed in that state, the flow volume is substantially fixed respectively at 54.2, 52.8 and 53.2 liter/min even under varying pressure differences. This trend remains the same as when the valve shaft 52 is given 5.5 rotations, 5.0 rotations and 4.5 rotations. The variation in the flow volume was within 10% at most even when the pressure difference varied.

Next, the example of using the leaf spring valve or the valve with the built-in drive valve body (hereinafter referred to as "the valve 60") according to this invention in an air conditioning device such as a fan coil unit or an air handling unit will be described below. In this case, the leaf spring valve concurrently fulfills the function of water-stop and the function of steady flow volume.

Figure 25:
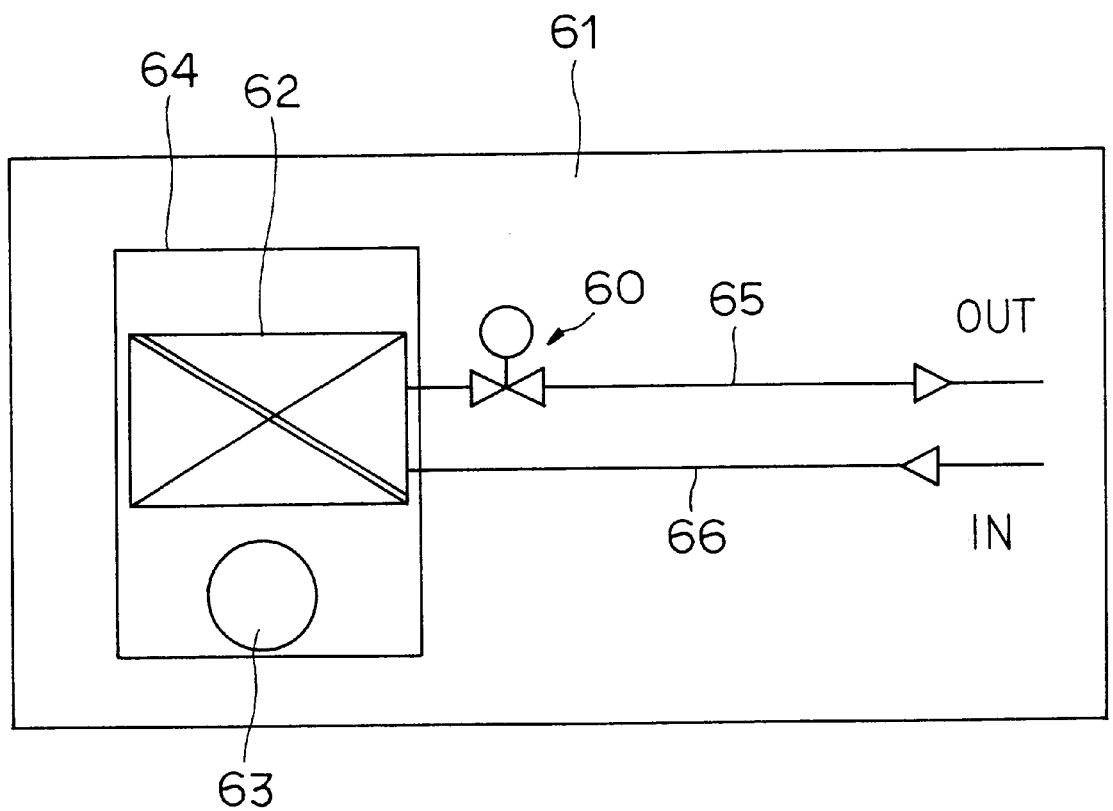
FIG. 25 is an explanatory diagram of an air conditioning device using the leaf spring valve contemplated by this invention in a fan coil unit.
Figure 26:
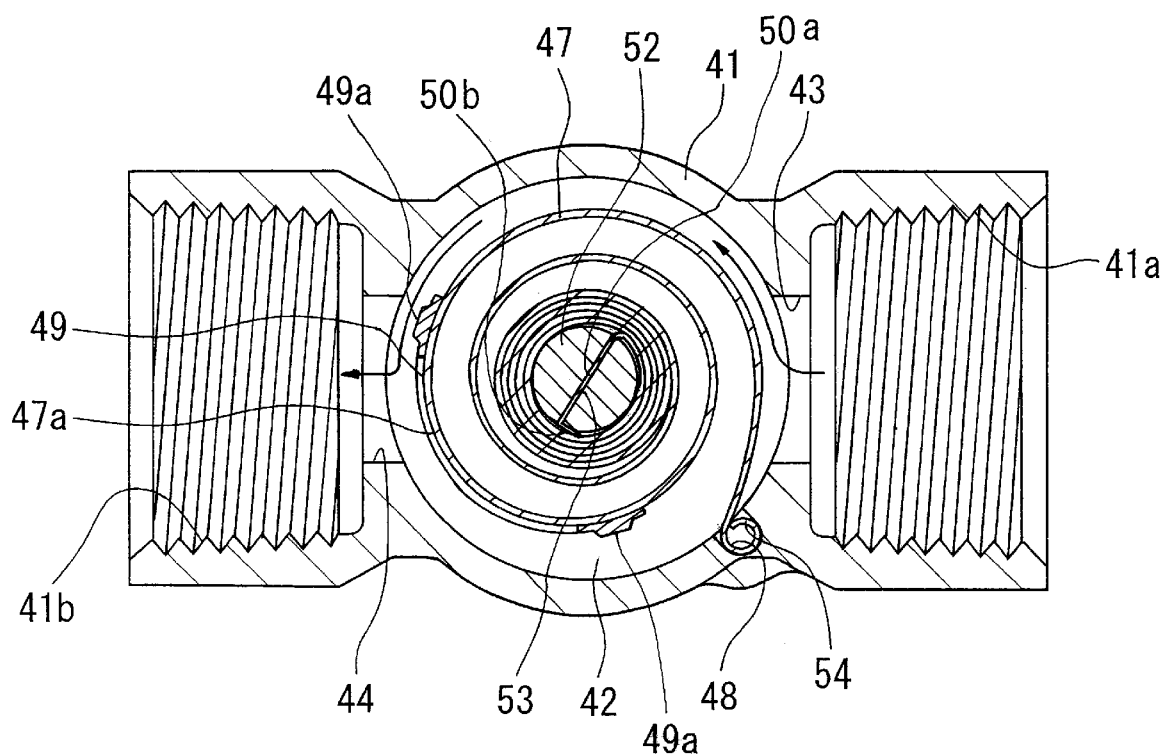
FIG. 26 is a section illustrating the state in which the leaf spring valve fulfills the function of a flow regulating valve.

FIG. 25 depicts an example of using the valve 60 for a fan coil unit 61. The fan coil unit 61 is a device for adjusting the room temperature in a fixed space by feeding cold water or hot water to the interior of a coil 62 and blowing wind against the surface of the coil 62 by means of a fan 63.

This diagram depicts the case of disposing the valve 60 in an "out" side pipe 65 of a cold/hot water device 64. This layout is not exclusive. The valve 60 may be disposed in an "in" side pipe 66, for example.

The valve 60 of this invention has such an operational characteristic as causes the valve to reach a fully opened state over a comparatively long time and reaches a fully closed state over a short period of time. It, therefore, best fits a device such as the fan coil unit 61 that does not need to reach the fully opened state abruptly.

Further, since the valve 60 of this invention is at an advantage in enjoying compactness of construction, permitting a reduction in cost, and excelling in economy, it particularly fits ideally an individual air conditioning device such as the fan coil unit that necessitates a multiplicity of valves.

The present embodiment has adduced a fan coil as an example of the air conditioning device. The valve 60 contemplated by this invention, however, does not need to be limited thereto. It similarly fits a device such as an air-handling unit, for example.

Further, the valve 60 according to this invention does not need to limit the use thereof to the air conditioning device but may be used for various other devices. To be specific, it may be advantageously used in an emergency valve such as a gas shut-down valve by harnessing the operational characteristic of reaching a fully closed state in a brief duration of time. The fluid for which the valve 60 of this invention is advantageously used is a fluid of low pressure difference such as, for example, cold/hot water or gas whose pressure difference is in the approximate range of 0.2 0.3 MPa (2 3 Kgf/cm$^2$).

INDUSTRIAL APPLICABILITY

As clearly noted from the foregoing description, the valve body is infallibly closed and stably operated because it is adapted to be closed with the restoring force of the leaf spring, the valve body is operated by dint of spring return with a light operating force because it is returned during the course of closing with the rewinding force of the spiral spring, and the torque does not need to be very large because the valve is operated in opposition only to the tightening force of the spring.

Further, the adoption of the spring return construction allows the valve body to serve concurrently as a return spring and warrants provision of a valve which is at an advantage in enjoying compactness of design, permitting a reduction in cost, and excelling in economy.

The valve provided by this invention is further at an advantage in incurring no wear, excelling in durability and enjoying a high practical value because the spring such as a spiral spring and the valve seat avoid generating an opening/closing motion accompanied by a sliding motion and succeed in obtaining an opening/closing motion by contact without any sliding motion.

The valve seat, because of the absence of any sliding motion during the course of an intermediate operation, is at an advantage in incurring seat wear only sparingly, sustaining no variation of the operating torque under the pressure of the fluid, offering a peeling action to the phenomenon of seizure of the valve seat, shunning the possibility of raising the operating torque, generating only a low operating torque on account of the resilient property of the spiral spring, obviating the necessity for unduly high accuracy of fabrication, and realizing miniaturization of the actuator and the valve.

The leaf spring valve contemplated by this invention has the function of a flow regulating valve and allows the flow volume to be arbitrarily set within a prescribed range by the rotational frequency of the valve shaft. To be specific, unlike the conventional flow regulating valve that requires a built-in steady flow device for exclusive use in conformity with the flow volume aimed at, this leaf spring valve is capable of setting the flow volume conforming to the prescribed flow volume by suitably varying the rotational frequency of the valve shaft.

The leaf spring valve according to this invention particularly befits an air conditioning device such as a fan coil unit or an air-handling unit, for example.

What is claimed is:

1. A leaf spring valve with a structure wherein one end of a spiral spring is fixed within a valve chamber of a valve box and the other end thereof is fixed to a valve shaft in said valve chamber, a lateral surface of said spiral spring is opposed in a pressed state to a valve seat in said valve box, and the lateral surface of said spiral spring is separated from said valve seat till a flow path on a secondary side is opened by rotating said valve shaft with an actuator or manual output to displace said spiral spring centripetally toward said valve shaft, whereas returning power of the spiral spring having energy stored therein presses the lateral surface of the spiral spring to be attached to the valve seat on the secondary side till the flow path is closed.

2. A leaf spring valve according to claim 1, wherein a position for setting said spiral spring in said valve chamber is in the proximity of the flow path on a primary side.

3. A leaf spring valve according to claim 2, wherein a sealing member formed of resilient material including rubber is integrally disposed at a valve seat sealing position of said spiral spring.

4. A leaf spring valve according to claim 2, wherein said leaf spring valve is effectively used in an air conditioning device that acquires a function of opening/closing or controlling a pipe for a fluid or fixing a steady flow volume.

5. A leaf spring valve according to claim 2, wherein the force of stored energy of said spring is approximately equal to a drive controlling force of said spiral spring.

6. A leaf spring valve according to claim 1, wherein a sealing member formed of resilient material including rubber is integrally disposed at a valve seat sealing position of said spiral spring.

7. A leaf spring valve according to claim 6, wherein said leaf spring valve is effectively used in an air conditioning device that acquires a function of opening/closing or controlling a pipe for a fluid or fixing a steady flow volume.

8. A leaf spring valve according to claim 6, wherein the force of stored energy of said spring is approximately equal to a drive controlling force of said spiral spring.

9. A leaf spring valve according to claim 1, wherein said spiral spring is displaced centripetally toward said valve shaft with said valve shaft rotated by an actuator or manually to acquire a function of steady flow volume.

10. A leaf spring according to claim 9, wherein said steady flow volume is arbitrarily set by rotational frequency of said valve shaft.

11. A leaf spring valve according to claim 10, wherein said leaf spring valve is effectively used in an air conditioning device that acquires a function of opening/closing or controlling a pipe for a fluid or fixing a steady flow volume.

12. A leaf spring valve according to claim 10, wherein the force of stored energy of said spring is approximately equal to a drive controlling force of said spiral spring.

13. A leaf spring valve according to claim 10, wherein said leaf spring valve is effectively used in an air conditioning device that acquires a function of opening/closing or controlling a pipe for a fluid or fixing a steady flow volume.

14. A leaf spring valve according to claim 9, wherein the force of stored energy of said spring is approximately equal to a drive controlling force of said spiral spring.

15. A leaf spring valve according to claim 1, wherein said leaf spring valve is effectively used in an air conditioning device that acquires a function of opening/closing or controlling a pipe for a fluid or fixing a steady flow volume.

16. A leaf spring valve according to claim 1, wherein the force of stored energy of said spring is approximately equal to a drive controlling force of said spiral spring.

* * * * *